United States Patent Office 3,806,418
Patented Apr. 23, 1974

3,806,418
MICROBIAL MODIFICATION OF BENZODIAZEPINE COMPOUNDS
Hisao Yamamoto, Nishinomiya, Shigeho Inaba, Takarazuka, Hiroo Wada, Takatsuki, Shigeo Ogino, Ashiya, and Fumitaka Kishimoto, Takarazuka, Japan, assignors to Sumitomo Chemical Company Limited
No Drawing. Filed June 16, 1972, Ser. No. 263,469
Claims priority, application Japan, June 18, 1972, 46/44,060
Int. Cl. C07b 29/02
U.S. Cl. 195—51 R
24 Claims

ABSTRACT OF THE DISCLOSURE

Method for microbial transformation of a benzodiazepine compound of the partial formula

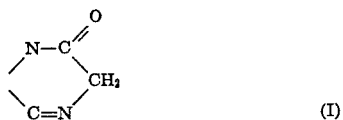

to a benzodiazepine compound of the partial formula

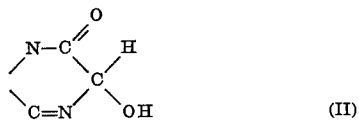

by fermenting the compound of partial Formula I in the presence of a strain of Streptomyces, or by incubating the compound of partial Formula I with resting cells of a strain of Streptomyces previously grown in a culture medium.

---

The present invention pertains to a method of causing the microbial transformation of a benzodiazepine compound having the following general Formula I:

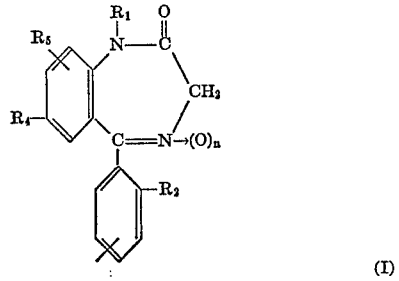

wherein $R_1$ is selected from the group consisting of hydrogen, carbamoyl, $C_1$–$C_4$ alkylcarbamoyl, $C_1$–$C_4$ alkyl, $C_2$–$C_5$ alkenyl, $C_3$–$C_5$ alkynyl, and $C_1$–$C_4$ alkyl, $C_2$–$C_5$ alkenyl and $C_3$–$C_5$ alkynyl substituted by one to three radicals selected from the group consisting of halogen, cyclo $C_3$–$C_6$ alkyl, aryl, heterocyclic ring, aralkyl, acyl, carbamoyl, $C_1$–$C_4$ alkylcarbamoyl, amino, $C_1$–$C_4$ alkylamino, di $C_1$–$C_4$ alkylamino and —X—$R_6$ (wherein X is one of the group consisting of oxygen, sulfur, sulfonyl and sulfinyl, and $R_6$ is one of the group consisting of hydrogen, $C_1$–$C_4$ alkyl, $C_1$–$C_4$ alkoxy, $C_1$–$C_4$ alkyl, halo $C_1$–$C_4$ alkyl, $C_2$–$C_5$ alkenyl, $C_2$–$C_5$ alkynyl, aryl, acyl, aralkyl, heterocyclic ring, carbamoyl and $C_1$–$C_4$ alkylcarbamoyl); $R_2$ is selected from the group consisting of hydrogen, halogen and $C_1$–$C_4$ alkyl; $R_3$ is selected from the group consisting of hydrogen, halogen, lower $C_1$–$C_4$ alkyl and lower $C_1$–$C_4$ alkoxy; $R_4$ is selected from the group consisting of halogen, trifluoromethyl, $C_1$–$C_4$ alkoxy, alkyl and nitro; $R_5$ is selected from the group consisting of hydrogen, halogen, $C_1$–$C_4$ alkyl and $C_1$–$C_4$ alkoxy, and $n$ is 0 or 1, which method comprises fermenting a compound of Formula I above in the presence of a certain strain of Streptomyces to obtain a compound of the group having the following general Formula II:

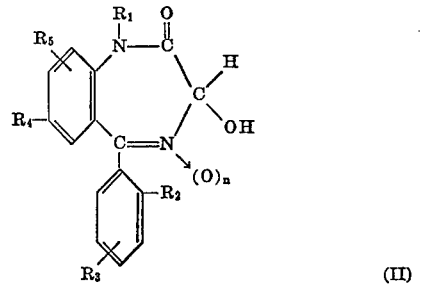

wherein $R_1$, $R_2$, $R_3$, $R_4$, $R_5$ and $n$ have the same meaning as in the Formula I, or incubating a compound of Formula I with resting cells of Streptomyces previously grown in an adequate medium to obtain a compound of Formula II.

More particularly a certain species of Streptomyces is cultured in an adequate medium preferably under aerobic conditions and either from the beginning of growth or after growth a benzodiazepine compound of the Formula I is added to the broth and transformed to a compound of the general Formula II.

On the other hand the microbial modification of such benzodiazepine compounds is also carried out by the method of using resting cells previously grown on an adequate medium containing a benzodiazepine compound of the general Formula I.

The products are isolated from fermented or incubated fluids by extracting with organic solvents. The compounds obtained by the method of the present invention are generally optically active and useful as intermediates for other benzodiazepines and/or also as tranquilizing agents.

The compounds having general Formula I can be manufactured by chemical methods such as described in Japanese patent application No. 45/28,187.

Such compounds also can be produced from the compounds having general Formula I, where $R_1$ is hydrogen, by treating the latter with active esters of alcohols having general formula $R_1$—OH, wherein $R_1$ has the same meaning as in the Formula I.

The composition of the nutrient medium utilized for culturing the microorganisms, as well as for the fermentation, may vary widely.

The microorganisms suitably employed in the process of the present invention are conveniently grown in a nutrient composition suitable for the proliferation of the cells which produce the hydroxylating enzyme.

Generally speaking, such nutrient medium should contain assimilable sources of nitrogen and carbon, and sources of such other nutrients as phosphorous, sulfur, potassium, trace elements and such other growth-promoting factors as the microorganisms may require.

As sources of nitrogen the following can be used: soy bean meal, peptone, meat extracts, corn steep liquor, asparagine, urea and mixtures thereof. As sources of carbon: glucose, starch, glycerol, dextrin, molasses and combinations thereof are satisfactory.

The pH of the culture medium and fermentation systems may preferably be near 7.0.

The temperature of these systems may vary from about 20° C. to about 37° C., preferred range being from about 28° C. to about 30° C.

The fermentation is aerobic and, moreover, agitation and aeration are desirable for optimum results.

Fermentation is conducted in an aqueous medium described above in an aerated fermentor. A strain selected from Streptomyces is inoculated and cultured. Either after growth or at the beginning of growth the substrate shown by Formula I is added and its substantial conversion to the compound shown in Formula II is usually effected during a 2 to 8 day fermentation period.

The substrate concentration may be varied over a wide range up to 5 g. or more per liter of culture being used.

It is preferred, however, to operate in the range of 0.5–5 grams of substrate per liter of culture.

The substrate may be added with or without dilution in a suitable solvent. Perferably, it is added as a 5–10 percent solution in an organic solvent such as ethanol. The substrate may be contacted with the microorganism and its enzymes without removing them from the growth medium or, alternatively the microorganism cells and enzymes may be first separated from the growth medium and contacted with the substrate in a suitable buffer other than the growth medium.

The substrate of the Formula I may be added all at once to the growth culture or enzyme preparation, in portions, or continuously during the growth and progress of the reaction.

The contact of the substrate of the Formula I with microorganism or enzymes is effectively accomplished by addition of fine suspension of substrate made by supersonic treatment.

The products obtained by the microbial conversion, i.e., the compounds of Formula II, can be isolated from the reaction mixture by conventional techniques utilizing differences between the products and impurities; such properties as solubility, adsorbability, distribution coefficient between solvents, etc. Culture fluids are extracted with organic solvents such as chloroform, carbontetrachloride, ethylene dichloride, dichloromethane, ether, etc., and concentrated.

The concentrates obtained may be further purified, if desired, by various techniques such as column or thin layer chromatography using silica gel or sephadex, extraction with acids and recrystallization.

Under certain conditions the process of dealkylation of benzodiazepine compound of the Formula I at $R_1$ as well as hydroxylation in Formula I, wherein $R_1$ is of the group consisting of various radicals except hydrogen, may be effected.

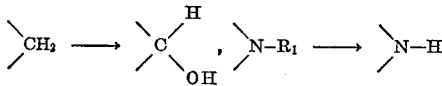

This invention also includes this process.

The novel conversion of this invention can be accomplished by any strains of microorganisms selected from genus Streptomyces which have hydroxylating enzyme systems. Such microorganisms are exemplified by the following species: *Streptomyces albidoflavus* ATCC 15844, *Streptomyces flavus* ATCC 3369, *Streptomyces griseochromogenes* ATCC 14511, *Streptomyces roseochromogenes* IFO 3363, *Streptomyces fradiae* IFO 3360, *Streptomyces griseus* IFO 3102, *Streptomyces takarazukaensis* S–3 FERM-P No. 943, *Streptomyces calvus* S–4 FERM-P No. 944, *Streptomyces fimicarius* S–12 FERM-P No. 945, *Streptomyces chartreusis* S–19 FERM-P No. 946, *Streptomyces transformans* S–60 FERM-P No. 947, *Streptomyces globisporus* S–120 FERM-P No. 948, and *Streptomyces benzodiazepinicus* S–145 FERM-P No. 949.

The seven "FERM-P" strains have been isolated by the present inventors from soil and have been deposited in the Fermentation Research Institute Agency of Industrial Science and Technology, Chiba, Japan, under the above accession numbers.

The names of "FERM-P" strains were designated by the results of the following classification for which Waksman System (S. A. Waksman, The Actinomycetes, vol. II, 1961) was adopted.

These strains form spores and aerial mycelia, but do not form sporangia.

Vegitative mycelium is nonseptate and not fragmenting into bacillary or cocoid elements. Spores form in chains. Thus these strains belong to the genus Streptomyces in Family II Streptomycetaceae.

The details of taxonomic studies of these strains are shown in the following tables.

TABLE I

| | S–3 | S–4 | S–12 |
|---|---|---|---|
| Morphology of sporophores. | Branched, in form of verticillis, long. | Branched, no verticillate, straight or slightly wavy with loose spirals. | Branched, short, straight. |
| Number of spores. | More than ten formed in chains. | More than ten formed in chains. | More than ten formed in chains. |
| Shape of spores. | Polyhedral 0.5×0.9μ. | Cylindrical 0.5–0.6×0.9–1.4μ. | Polyhedral or cylindrical 0.6–0.7×1.1–1.3μ. |
| Growth on solid medium: | | | |
| Sucrose-nitrate agar. | Growth moderate, gray to cream; colony flat; aerial mycelium produced late, white to gray. | Growth poor or moderate, white to gray; aerial mycelium produced late, white to gray. | Growth good, white to dull-yellow; surface powdery; aerial mycelium produced early, abundant, white to yellowish gray. |
| Glucose-asparagine agar. | Growth moderate, gray to cream; colony circular; aerial mycelium abundant, white. | Growth moderate, gray to white; colony circular; aerial mycelium good, white to gray. | Growth moderate yellowish-gray; aerial mycelium produced, moderate, yellowish-gray. |
| Starch agar. | Growth good, gray or white to dark yellowish-brown; aerial mycelium abundant, white to gray. | Growth good, gray to brownish gray; colony flat; aerial mycelium abundant, white to gray. | Growth good, white to dull-orange; aerial mycelium produced early, abundant, pale yellowish-brown. |
| Tyrosine agar. | Growth moderate or poor, white to yellowish-orange; colony circular, cottony; aerial mycelium produced early, abundant, white. | Growth poor, gray or brown; colony flat; aerial mycelium poor, white or gray. | Growth good, gray to pale yellowish-brown; aerial mycelium produced early, abundant, yellowish-gray. |
| Nutrient agar. | Growth moderate, white or yellow; colony circular, rigid; aerial mycelium produced early, abundant, white. | Growth moderate, white or yellow; colony circular, flat; aerial mycelium abundant, white or gray. | Growth good, white to brownish-yellow; aerial mycelium produced early, white to yellowish-gray. |
| Potato-glucose agar. | Growth good, white to purple to brownish-black; colony circular, rigid; aerial mycelium produced early, abundant, gray or pinkish-white. | Growth good, white or gray; colony raised; aerial mycelium produced early, abundant, white or gray. | Growth abundant, white or gray to brown; colony powdery, raised; aerial mycelium produced early, abundant, yellowish-gray. |
| Pepton-glucose agar. | Growth good, gray to brown; colony spindly raised, rugous; aerial mycelium produced late, poor, gray. | Growth good, gray or brown; colony spindly, raised, rough surface; aerial mycelium produced early, poor, white or gray. | Growth good, white or gray; colony rigid, surface flat; aerial mycelium produced early, abundant, gray; or yellowish-gray. |
| Loeffler's serum. | Growth moderate, white, membranous. | Growth moderate, white or gray. | Growth good, white or gray; aerial mycelium, pale yellow. |

| | S–19 | S–60 | S–120 | S–145 |
|---|---|---|---|---|
| Morphology of sporophores. | Monopodially branched, with screw coils. | Monopodially branched with short coils. | Branched in form of tufts, straight or slightly curved. | Branched, verticilate, loop shaped. |
| Number of spores. | More than ten formed in chains. | More than two formed in chains. | More than ten formed in chains. | More than ten formed in chains. |
| Shape of spores. | Oval, surface covered with spines 0.5–0.6×0.8–1.2μ. | Polyhedral 0.8–0.9×1.0–1.4μ. | Cylindrical 0.6–0.8×1.0–1.5μ. | Round to oval 0.9–1.3×1.0–1.5μ. |

TABLE I—Continued

| | S-19 | S-60 | S-120 | S-145 |
|---|---|---|---|---|
| Growth on solid medium: | | | | |
| Sucrose-nitrate agar. | Growth good, greenish-gray; aerial mycelium produced early, abundant, bluish-gray. | Growth good, gray to yellowish-brown; aerial mycelium produced late, abundant, bluish-gray. | Growth moderate, dull-orange-buff; aerial mycelium produced early, good, yellowish-gray. | Growth poor, white to grayish-brown; aerial mycelium produced early grayish-red to brown. |
| Glucose-asparagine agar. | Growth good, colorless; colony wet, yeast-like; aerial mycelium produced late, bluish-gray. | Growth good, dark brown; colony raised; aerial mycelium produced early, abundant, bluish-gray. | Growth moderate, pale yellow; colony wet, circular; aerial mycelium poor, white or pale yellow. | Growth poor to moderate, light bluish-gray; aerial mycelium produced early, abundant, grayish-red brown. |
| Starch agar | Growth good, gray to brownish gray; aerial mycelium produced early, abundant, gray or bluish-gray. | Growth good, white or pale cream; aerial mycelium produced early, abundant, gray to brownish-gray. | Growth good, white to pale yellowish-brown; aerial mycelium produced early, abundant. | Growth good, white to grayish-brown; colony white, cottony; aerial mycelium abundant, grayish-red brown. |
| Tyrosine agar | Growth good, gray black; aerial mycelium produced early, abundant, brownish-gray. | Growth poor; colony gray; aerial mycelium produced early, gray. | Growth good, gray to yellowish-gray; colony flat, circular; aerial mycelium abundant, gray or yellowish-gray. | Growth poor, white to grayish-red brown; aerial mycelium grayish-red brown. |
| Nutrient agar | Growth moderate or poor, light brownish-gray or colorless; aerial mycelium scanty. | Growth moderate or poor, colorless or gray; colony circular, flat; no aerial mycelium. | Growth good, white to light brown; colony circular, flat; aerial mycelium produced early, abundant, white or yellowish-gray. | Growth moderate or poor, gray or white to yellowish-gray; colony wet, bacteria-like; no aerial mycelium. |
| Potato-glucose agar. | Growth good, yellowish white to dark bluish-green; colony wet, rugous, yeastlike; aerial mycelium produced late, abundant, gray or bluish-gray. | Growth good, gray or bluish gray; colony rugous, raised; aerial mycelium abundant, bluish-gray or gray. | Growth abundant, white to orange to dark bluish-gray; aerial mycelium produced late, abundant, pale yellowish-brown. | Growth abundant, white to yellowish-brown; colony cottony; aerial mycelium produced early, grayish-brown. |
| Peptone-glucose agar. | Growth moderate, gray to yellowish-gray to dark brown; colony yeast-like, wet, rugous. | Growth good, pale yellowish-brown; colony raised, rugous; aerial mycelium produced late, gray. | Growth good, yellow to brown; aerial mycelium produced early, yellowish-gray. | Growth good, white to pale yellow; aerial mycelium poor. |
| Loeffler's serum. | Growth good, yellowish-gray; aerial mycelium yellow. | Growth moderate or poor, white. | Growth good, white, membranous; aerial mycelium white. | Growth poor, white or gray. |

TABLE II
[Physiological condition]

| | S-3 | S-4 | S-12 |
|---|---|---|---|
| Optimum temperature (° C.) | 25–37; optimum at 30 | 25–37; optimum at 30 | 25–40; optimum at 37. |
| Relation to pH | pH 6–10; optimum at pH 8 | pH 6–10; optimum at pH 8 | pH 6–10; optimum at pH 8. |
| Liquefaction of gelatin | None | None | Liquefaction. |
| Action on milk | Slight coagulation; no peptonization | No coagulation; peptonization | No coagulation; peptonization. |
| Melanin formation | None | None | None. |
| Hydrolysis of starch | Positive | Positive | Positive. |
| Action on nitrate | Nitrite | Nitrite | No nitrite. |

| | S-19 | S-60 | S-120 | S-145 |
|---|---|---|---|---|
| Optimum temperature, °C | 25–40; optimum at 37 | 25–37; optimum at 30 | 25–40; optimum at 30 | 25–40; optimum at 37. |
| Relation to pH | pH 6–10; optimum at pH 8 | pH 4–10; optimum at pH 6 | pH 6–10; optimum at pH 8 | pH 4–10; optimum at pH 7. |
| Liquefaction of gelatin | Liquefaction | None | Liquefaction | None. |
| Action on milk | No coagulation; peptonization. | Strong coagulation; no peptonization. | No coagulation, peptonization. | Coagulation, peptonization. |
| Melanin formation | Melanin formed | Melanin formed | None | None. |
| Hydrolysis of starch | Positive | Positive | Positive | Positive. |
| Action on nitrate | Nitrite | No nitrite | Nitrite | No nitrite. |

TABLE III
[Sugar assimilation]

| | S-3 | S-4 | S-12 | S-19 | S-60 | S-120 | S-145 |
|---|---|---|---|---|---|---|---|
| L-arabinose | − | − | + | + | + | + | + |
| D-xylose | + | + | + | + | + | + | + |
| D-glucose | + | + | + | + | + | + | + |
| D-fructose | + | + | + | + | + | + | + |
| Sucrose | + | + | + | + | + | + | + |
| Inositol | − | ± | + | + | + | + | + |
| L-rhamnose | + | + | + | + | + | + | + |
| Raffinose | + | + | + | + | + | + | + |
| D-mannitole | − | ± | + | + | + | + | + |

According to the results shown in the above tables, each strain was classified as follows.

(1) S-3 (FERM-P No. 943): Sporophore arises from aerial mycelium in the form of verticils, forms spirals, and does not produce melanin. From these characteristics, strain S-3 resembles to *Streptomyces kentuckensis* Barr and Carman, 1956, but differs in the following points. Strain S-3 peptonized milk, liquefied gelatin, and produced oval or ellipsoidal spores.

From these results, the strain S-3 properly assigned to a new species. Thus it was named *Streptomyces takarazukaensis* S-3.

(2) S-4 (FERM-P No. 944): Among known species, strain S-4 has many common characteristics to *Streptomyces calvus* Backus et al., 1957, but differs from it in such properties as partial liquefaction of gelatin coagulation of milk, and the pattern of assimilation of raffinose and arabinose.

Thus the strain S-4 is properly assigned to a new strain of *Streptomyces calvus*.

(3) S-12 (FERM-P No. 945): In respect of many characteristics, strain S-12 resembles to *Streptomyces fimicarium* Waksman and Henrici, 1948, but differs from it in such properties as shape of spore and mode of growth on nutrient agar. Thus it is thought to be proper to assign strain S-12 to a new strain of *Streptomyces fimicarium*.

(4) S-19 (FERM-P No. 946): Strain S-19 does not produce soluble pigments on starch media, nutrient agar media, and potato agar media. Besides the production of soluble pigments, other characteristics of strain S-19 also resembles to *Streptomyces chartreusis* Calhoun and Johnson, 1956. Thus the strain S-19 is properly assigned to a new strain of *Streptomyces chartreusis* S-19.

(5) S-60 (FERM-P No. 947): Spores are formed in sporophores which arise from the aerial mycelium in the form of verticils. Melanin is produced on tyrosine agar media.

Brown growth is obtained and aerial mycelium is white or gray.

From these results, the strain S–60 resembles to *Streptomyces griseochromogenes* Fukunaga et al., 1955. However, both strains differ in the following properties: the color of growth and aerial mycelium on sucrose agar media, the production of aerial mycelium on asparagine agar media, the production of aerial mycelium, color of soluble pigments on nutrient agar media, the liquefaction of gelatin, the coagulation and the peptonization of milk, and the resuction of nitrate.

From these resutls the strain S–60 is assigned to a new species and named *Streptomyces transformans* S–60.

(6) S–120 (FERM-P No. 948): Strain S–120 has many common characteristics to *Streptomyces globisporus* Waksman among known species. However, strain S–120 does not produce soluble pigments on sucrose agar media and glucose-peptone agar media, on which growth is colorless or greenish. From these points the strain S–120 is seemed to be a new strain of *Streptomyces globisporus*.

(7) S–145 (FERM-P No. 949): Sporophores arise from aerial mycelium in the fom of verticils and form compact loops. Melanin is not produced, growth is yellowish or gray and aerial mycelium is white or pinkish. Among known species, *Streptomyces hachijoensis* Yamaguchi, 1954 and *Streptomyces matensis* Margalith et al., 1959 have relatively resembling characteristics to the strain S–145.

However, *Streptomyces hachijoensis* shows white or pinkish-buff growth on sucrose agar media, forms cottony aerial mycelium on nutrient agar media and rapidly liquefiies gelatin. On the other hand, *Streptomyces matensis* produces bluish soluble pigments on sucrose agar media and forms white aerial mycelium on nutrient agar media.

From these points it is difficult to assign the strain S–145 to either of the two described above. Therefore the strain S–145 was designated as a new species and named *Streptomyces benzodiazepinicus* S–145.

According to the present process, the following benzodiazepine compounds are produced, for example;

3-hydroxy-5-phenyl-7-chloro-1,3-dihydro-2H-1,4-benzodiazepine-2-one,
3-hydroxy-5-phenyl-7-nitro-1,3-dihydro-2H-1,4-benzodiazepine-2-one,
3-hydroxy-5-phenyl-7-trifluoromethyl-1,3-dihydro-2H-1,4-benzodiazepine-2-one,
3-hydroxy-5-phenyl-7-methoxy-1,3-dihydro-2H-1,4-benzodiazepine-2-one,
3-hydroxy-5-phenyl-7-methyl-1,3-dihydro-2H-1,4-benzodiazepine-2-one,
3-hydroxy-5-phenyl-7,9-dichloro-1,3-dihydro-2H-1,4-benzodiazepine-2-one,
3-hydroxy-5-(o-chlorophenyl)-7-chloro-1,3-dihydro-2H-1,4-benzodiazepine-2-one,
3-hydroxy-5-(o-chlorophenyl)-7-nitro-1,3-dihydro-2H-1,4-benzodiazepine-2-one,
3-hydroxy-5-(o-fluorophenyl)-7-chloro-1,3-dihydro-2H-1,4-benzodiazepine-2-one,
3-hydroxy-5-(o-fluorophenyl)-7-nitro-1,3-dihydro-2H-1,4-benzodiazepine-2-one,
3-hydroxy-5-(o-tolyl)-7-chloro-1,3-dihydro-2H-1,4-benzodiazepine-2-one,
3-hydroxy-5-(p-hydroxyphenyl)-7-chloro-1,3-dihydro-2H-1,4-benzodiazepine-2-one,
3-hydroxy-5-(p-chlorophenyl)-7-chloro-1,3-dihydro-2H-1,4-benzodiazepine-2-one,
3-hydroxy-5-(o-chloro-p-hydroxy-phenyl)-7-chloro-1,3-dihydro-2H-1,4-benzodiazepine-2-one,
3-hydroxy-5-(o-methyl-p-chloro-phenyl)-7-chloro-1,3-dihydro-2H-1,4-benzodiazepine-2-one,
1-methyl-3-hydroxy-5-phenyl-7-chloro-1,3-dihydro-2-H-1,4-benzodiazepine-2-one,
1-methyl-3-hydroxy-5-(o-chloro-phenyl)-7-chloro-1,3-dihydro-1,4-benzodiazepine-2-one,
1-methyl-3-hydroxy-5-(o-fluoro-phenyl)-7-chloro-1,3-dihydro-2H-1,4-benzodiazepine-2-one,
1-methyl-3-hydroxy-5-(o-chloro-phenyl)-7-nitro-1,3-dihydro-2H-1,4-benzodiazepine-2-one,
1-methyl-3-hydroxy-5-phenyl-7-nitro-1,3-dihydro-2H-benzodiazepine-2-one,
1-methyl-3-hydroxy-5-phenyl-7-trifluoromethyl-1,3-dihydro-2H-1,4-benzodiazepine-2-one,
1-cyclopropylmethyl-3-hydroxy-5-phenyl-7-chloro-1,3-dihydro-2H-1,4-benzodiazepine-2-one,
1-cyclopropylmethyl-3-hydroxy-5-(o-chloro-phenyl)-7-chloro-1,3-dihydro-2H-1,4-benzodiazepin-2-one,
1-methylcarbamoyl-3-hydroxy-5-phenyl-7-chloro-1,3-dihydro-2H-1,4-benzodiazepine-2-one,
1-methylcarbamoyl-3-hydroxy-5-phenyl-7-nitrol-1,3-dihydro-2H-1,4-benzodiazepine-2-one,
1-methylcarbamoylmethyl-3-hydroxy-5-phenyl-7-chloro-1,3-dihydro-2H-1,4-benzodiazepine-2-one,
1-($\beta$-ethylaminoethyl)-3-hydroxy-5-(o-fluorophenyl)-7-chloro-1,3-dihydro-2H-1,4-benzodiazepine-2-one,
1-($\beta$-diethylaminoethyl)-3-hydroxy-5-phenyl-1-(o-fluorophenyl)-7-chloro-1,3-dihydro-2H-1,4-benzodiazepine-2-one,
1-($\gamma$-dimethylaminopropyl)-3-hydroxy-5-(o-fluorophenyl)-7-chloro-1,3-dihydro-2H-,1,4-benzodiazepine-2-one,
1-($\beta$-piperydinoethyl)-3-hydroxy-5-(o-fluorophenyl)-7-chloro-1,3-dihydro-2H-1,4-benzodiazepine-2-one,
1-($\beta$-hydroxyethyl)-3-hydroxy-5-(o-fluorophenyl)-7-chloro1,3-dihydro-2H-1,4-benzodiazepine-2-one,
1-($\beta$-ethoxyethyl)-3-hydroxy-5-(o-fluorophenyl)-7-chloro-1,3-dihydro-2H-1,4-benzodiazepine-2-one,
1-methoxymethyl-3-hydroxy-5-phenyl-7-chloro-1,3-dihydro-2H-1,4-benzodiazepine-2-one,
1-methoxymethyl-3-hydroxy-5-phenyl-7-nitro-1,3-dihydro-2H-1,4-benzodiazepine-2-one,
1-[($\beta$-chloro-$\alpha$-methoxy)-ethyl]-3-hydroxy-5-phenyl-7-chloro-1,3-dihydro-2H-1,4-benzodiazepine-2-one,
1-(methylthiomethyl)-3-hydroxy-5-phenyl-7-chloro-1,3-dihydro-2H-1,4-benzodiazepine-2-one,
1-(methylsulfinylmethyl)-3-hydroxy-5-(o-chlorophenyl)-7-chloro-1,3-dihydro-2H-1,4-benzodiazepine-2-one,
1-($\beta$-methylsulfonylmethyl)-3-hydroxy-5-(o-fluorophenyl)-7-chloro-1,3-dihydro-2H-1,4-benzodiazepine-2-one,
1-(methoxyethoxyethyl)-3-hydroxy-5-phenyl-7-chloro-1,3-dihydro-2H-1,4-benzodiazepine-2-one,
1-[($\beta$-acetoxy-1-methoxy)ethyl]-3-hydroxy-5-phenyl-7-chloro-1,3-dihydro-2H-1,4-benzodiazepine-2-one,
1-[($\beta$-hydroxyl-1-methoxy)ethyl]-3-hydroxy-5-phenyl-7-chloro-1,3-dihydro-2H-1,4-benzodiazepine-2-one,
1-($\beta$-phenoxy-ethyl)-3-hydroxy-5-phenyl-7-chloro-1,3-dihydro-2H-1,4-benzodiazepine-2-one,
1-($\beta$-benzyloxy-ethyl)-3-hydroxy-5-phenyl-7-chloro-1,3-dihydro-2H-1,4-benzodiazepine-2-one,
1-($\beta$-pyranyloxy-ethyl)-3-hydroxy-5-(o-fluorophenyl)-7-chloro-1,3-dihydro-2H-1,4-benzodiazepine-2-one,
1-($\beta$-vinyloxy-ethyl)-3-hydroxy-5-phenyl-7-chloro-1,3-dihydro-2H-1,4-benzodiazepine-2-one,
1-($\beta$-chloroethoxy)methyl-3-hydroxy-5-phenyl-7-chloro-1,3-dihydro-2H-1,4-benzodiazepine-2-one, and
1-($\beta,\beta,\beta$-trifluoroethyl)-3-hydroxy-5-phenyl-7-chloro-1,3-dihydro-2H-1,4-benzodiazepine-2-one.

The present process is illustrated in greater details by the following examples, which are to be construed as illustrative and not limitative of the invention.

EXAMPLE 1

*Streptomyces transformans* S–60 (FERM-P No. 947) from an agar slant was transferred to a 500 ml. Sakaguchi flask containing 100 ml. of the following medium; glucose 5 g., yeast extract 0.5 g., soy bean meal 0.5 g., $KHP_2O_4$ 0.1 g., $K_2HPO_4$ 0.2 g., $FeSO_4 \cdot 7H_2$ 0.1 g., tap water 100 ml., pH 7.0.

The flask was incubated on a reciprocal shaker at 30° C.

After 24 hours of culture, 2% of a mycelial transfer was made to each of twenty new Sakaguchi flasks containing 100 ml. of the same medium as described above. After additional 24 hours of incubation as above, 100 mg. of 1-cyclopropyl methyl-5-phenyl-7-chloro-1,3-dihydro-2H-1,4-benzodiazepine-2-one in 2.0 ml. of ethanol was added to each flask. After further 7 days incubation culture fluids were extracted with chloroform and extracts were evaporated to dryness under reduced pressure.

The residue, 1.93 g., was dissolved in a mixture of chloroform/acetone/ethanol (17:2:1 by volume) and then applied on the top of the silica gel column. The development was carried out by the same solvent and 1-cyclopropylmethyl - 3 - hydroxy-5-phenyl-7-chloro-1,3-dihydro-2H-1,4-benzodiazepine-2-one melting at 159–161° C. and 3-hydroxy-5-phenyl-7-chloro-1,3-dihydro-2H-1,4-benzodiazepine-2-one melting at 203–204° C., $[\alpha]_D^{25} = +10.4$ (c.=0.5, in methanol) were obtained.

The infrared spectra of those products were identical with those of 1-cyclopropylmethyl-3-hydroxy-5-phenyl-7-chloro-1,3-dihydro-2H-1,4-benzodiazepine-2 - one and 3-hydroxy - 5 - phenyl - 7 - chloro-1,3-dihydro-2H-1,4-benzodiazepine-2-one, respectively.

EXAMPLE 2

*Streptomyces benzodiazepinicus* S–145 (FERM-P No. 949) was grown on the same medium described as Example 1 at 28° C. After 24 hours incubation a mycelial transfer (2%) was made to each of thirty new Sakaguchi flasks containing 100 ml. of the same medium as above.

After good growth 100 mg. of 5-(2′-fluorophenyl)-7 - chloro - 1,3 - dihydro-2H-1,4-benzodiazepine-2-one in 2.0 ml. ethanol was added to each flask. Following 5 days incubation, culture fluids were extracted with chloroform and 2.27 g. of crude crystals were obtained by the same procedure described in Example 1.

The crude crystals were dissolved in 20 ml. of chloroform and applied on Sephadex LH–20 column (2.5 cm. x 80 cm.). The substrate was eluted by chloroform, and then 3 - hydroxy - 5 - (2′-fluorophenyl)-7-chloro-1,3-dihydro-2H-1,4-benzodiazepine-2-one was obtained by elution with ethanol.

The residue derived from ethanol eluates was recrystallized from ethanol. The physicochemical properties of 3-hydroxy - 5 - (2′ - fluorophenyl)-7-chloro-1,3-dihydro-2H - 1,4 - benzodiazepine-2-one obtained as above were as follows: M.P. 193–194° C., $[\alpha]_D^{24} = -31.0$ (c.=0.58, DMSO).

Elementary analysis.—Calculated (percent): C, 59.13; H, 3.31; N, 9.19; Cl, 11.63. Found (percent): C, 59.15; H, 3.36; N, 9.09; Cl, 11.41.

EXAMPLE 3

The fermentation was conducted with *Streptomyces takarazukaensis* S–3 (FERM-P No. 943) as described in Example 1, except that the substrate, 1-methyl-5-phenyl-7-chloro-1,3-dihydro - 2H - 1,4 - benzodiazepine-2-one, was added thereto.

The products were extracted as described in Example 1 and purified as in Example 2, which by recrystallization from ethanol yielded 1 - methyl - 3 - hydroxy-5-phenyl-7-chloro-1,3-dihydro-2H-1,4-benzodiazepine-2-one, melting at 118–120° C. and 3-hydroxy-5-phenyl-7-chloro-1,3-dihydro-2H-1,4-benzodiazepine-2-one. The identity of those compounds was respectively established by IR spectroscopy.

EXAMPLE 4

A mycerial transfer of *Streptomyces calvus* S–4 (FERM-P No. 944) previously grown on the same media as in Example 1 was made to each of twenty flasks containing 100 ml. medium of the same composition as in Example 1. Following 48 hours cultivation at 28° C., 100 mg. of 1-methyl-5-phenyl-7-nitro-1,3-dihydro-2H-1,4-benzodiazepine-2-one in 2.0 ml. of ethanol was added to each flask. After further 8 days cultivation culture fluids were extracted as described in Example 1.

The crude crystals were purified as the similar procedure in Example 2 by which yielded 1-methyl-3-hydroxy-5-phenyl-7-nitro-1,3-dihydro-2H - 1,4 - benzodiazepine-2-one melting at 201–202° C. and 3-hydroxy-5-phenyl-7-nitro-1,3-dihydro-2H-1,4-benzodiazepine-2-one melting at 199–201° C.

The infrared spectra of these are identical with the ones of standard compounds.

EXAMPLE 5

The fermentation was conducted with *Streptomyces fimicarius* S–12 (FERM-P No. 945) as described in Example 1, except that the substrate 1-methyl-5-phenyl-7-trifluoromethyl-1,3-dihydro - 2H - 1,4 - benzodiazepine-2-one was added at the beginning of the growth thereto.

The culture fluids were extracted with the method as in Example 1. The crude products were separated and purified as in Example 2, by which yielded 1-methyl-3-hydroxy-5-phenyl-7-trifluoromethyl - 1,3 - dihydro-2H-1,4-benzodiazepine-2-one melting at 183–185° C. and 3-hydroxy-5-phenyl-7-trifluoromethyl - 1,3 - dihydro-2H-1,4-benzodiazepine-2-one melting at 189–191° C.

The identity of those compounds was respectively established by IR spectroscopy.

EXAMPLE 6

The fermentation was conducted with *Streptomyces chartreusis* S–19 (FERM-P No. 946) as described in Example 1, except that 2 ml. of sonicated suspension containing 100 mg. of substrate, 5-phenyl-7-chloro-1,3-dihydro-2H - 1,4 - benzodiazepine-2-one, was added to each flask. The fine suspension was made by sonication of substrate suspended in the medium having the same composition as in Example 1.

The extraction was carried out according to the procedure described in Example 1 and 1.97 g. of crude crystals were obtained.

The separation and purification of the crude products carried out as described in Example 2 which yielded 3-hydroxy-5-phenyl-7-chloro-1,3-dihydro - 2H - 1,4-benzodiazepine-2-one melting at 202–203° C.

The infrared spectrum of this compound was identical with the one of the standard compound.

EXAMPLE 7

*Streptomyces globisporus* S–120 (FERM-P No. 948) was grown in a 500 ml. Sakaguchi flask containing 100 ml. of the medium as described in Example 1.

Sixty ml. of the heavy growth which had developed was transferred to 6 liters of the medium described above in a 10 liter stirred jar fermentor. The fermentor was incubated at 30° C. and during fermentation an air flow and agitation were maintained.

After 24 hours cultivation 6 g. of 1-methyl-5-(2′-chlorophenyl)-7-chloro - 1,3 - dihydro-2H-1,4-benzodiazepine-2-one dissolved in ethanol was added thereto. Following 6 days cultivation extraction was carried out as described in Example 1 and 5.84 g. of crude crystals were obtained.

The separation and purification of the crude mixture were accomplished by the method described in Example 2 and yielded 1-methyl-3-hydroxy-5(2′-chlorophenyl)-7-chloro-1,3 - dihydro-2H-1,4-benzodiazepine-2-one melting at 197–200° C. and 3-hydroxy-5-(2′-chlorophenyl)-7-chloro-1,3-dihydro-2H - 1,4 - benzodiazepine-2-one melting at 165–167° C.

The identity of those compounds was respectively established by IR spectroscopy.

EXAMPLE 8

A mycerial transfer of *Streptomyces benzodiazepinicus* S-145 (FERM-P No. 949) was made to three Sakaguchi flasks containing 100 ml. of medium described in Example 1.

After 2 days cultivation, 10 mg. of 5-phenyl-7-trifluoromethyl-1,3-dihydro-2H-1,4-benzodiazepine-2-one dissolved in ethanol was added to each flask. Following 30 hours incubation the heavy growth which had developed was harvested by filtration, washed by 0.05 M phosphate buffer, pH 7.0, and suspended into 50 ml. of the same buffer but containing 0.1% of glucose.

Two ml. of sonicated suspension containing 100 mg. of 5-phenyl-7-trifluoromethyl-1,3-dihydro-2H-1,4-benzodiazepine-2-one, which had been made from the substrate suspension in the phosphate buffer containing 0.1% glucose by ultrasonicator, was added to the above mycerial suspension. The mixture was incubated at 28° C. on a Monod Shaker with addition of trace amounts of toluene.

After 20 hours incubation the reaction mixture was extracted by chloroform. The crude product was purified as in Example 2, by which yielded 3-hydroxy-5-phenyl-7-trifluoromethyl - 1,3 - dihydro-2H-1,4-benzodiazepine-2-one melting at 189–191° C.

EXAMPLE 9

*Streptomyces albidoflavus* ATCC 15844 from an agar slant was transferred to a 500 ml. Sakaguchi flask containing 100 ml. of the following medium; glucose 1 g., polypeptone 0.2 g., meat extract 0.1 g., yeast extract 0.1 g., tap water 100 ml., pH 7.0. The flask was incubated on a reciprocal shaker at 30° C. After 24 hours incubation, 100 mg. of 5-phenyl-7-nitro-1,3-dihydro-2H-1,4-benzodiazepine-2-one in 2.0 ml. of ethanol was added to the flask. After further 6 days incubation culture fluids were extracted with chloroform and extracts were evaporated to dryness under reduced pressure. The crude crystals, 97 mg., were purified as in Example 2, which by recrystallization from ethanol yielded 3-hydroxy-5-phenyl-7-nitro-1,3-dihydro-2H-1,4-benzodiazepine - 2 - one. The identity of this compound was established by IR spectroscopy.

EXAMPLE 10

*Streptomyces flavus* ATCC 3369 was grown on the same medium described as Example 9. After 24 hours cultivation a mycelial transfer (2%) was made to each of ten new Sakaguchi flasks containing 100 ml. of the same medium as above. After good growth 100 ml. of 5-(2'-fluorophenyl)-7-chloro-1,3-dihydro-2H-1,4 - benzodiazepine-2-one in 2.0 ml. ethanol was added to each flask. Following 6 days cultivation culture fluids were extracted with chloroform and 755 mg. of crude crystals were obtained by the same procedure described in Example 1. The crude crystals were purified by the similar procedure described in Example 2 by which yielded 3-hydroxy-5-(2'-fluorophenyl)-7-chloro-1,3-dihydro - 2H - 1,4-benzodiazepine-2-one melting at 193–194° C. The identity of this compound was established by IR spectroscopy.

EXAMPLE 11

The fermentation was conducted with *Streptomyces fradiae* IFO 3360 as described in Example 1, except that the substrate 5-phenyl-7-methoxy-1,3-dihydro - 2H - 1,4-benzodiazepine-2-one was added.

The culture fluids were extracted by the method as in Example 1.

The crude products were purified as in Example 2, by which yielded 3-hydroxy-5-phenyl-7-methoxy - 1,3 - dihydro-2H-1,4-benzodiazepine-2-one.

The identity of this compound was established by IR spectroscopy.

EXAMPLE 12

The fermentation was conducted with *Streptomyces griseus* IFO 3102 as described in Example 1, except that the substrate 5-phenyl-7-methyl - 1,3 - dihydro - 2H - 1,4-benzodiazepine-2-one was added.

The culture fluids were extracted by the method as in Example 1.

The crude crystals obtained were purified as in Example 2, by which yielded 3-hydroxy-5-phenyl-7-methyl-1,3-dihydro-2H-1,4-benzodiazepine-2-one.

The identity of this compound was established by IR spectroscopy.

EXAMPLE 13

*Streptomyces griseochromogenes* ATCC 14511 from an agar slant was transferred to a 500 ml. Sakaguchi flask containing 100 ml. of the following medium glucose 1 g., soy bean meal 1.5 g., NaCl 0.5 g., tap water 100 ml., pH 7.0.

The flask was incubated on a reciprocal shaker at 28° C. After 24 hours incubation, a mycelial transfer (2%) was made to each of ten new flasks containing 100 ml. of the same medium as described above.

After additional 24 hours of incubation, 100 mg. of 5-phenyl-7,9-dichloro-1,3-dihydro - 2H - 1,4-benzodiazepine-2-one in 2.0 ml. of ethanol was added to each flask. After further 7 days incubation culture fluids were extracted with chloroform and extracts were evaporated to dryness under reduced pressure.

The residue was purified as in Example 2, by which yielded 3-hydroxy-5-phenyl-7,9-dichloro - 1,3 - dihydro-2H-1,4-benzodiazepine-2-one.

The identity of this compound was established by IR spectroscopy.

EXAMPLE 14

*Streptomyces benzodiazepinicus* S-145 (FERM-P No. 949) was grown on the same medium described in Example 13. After 24 hours incubation a mycelial transfer (2%) was made to each of ten new Sakaguchi flasks containing 100 ml. of the same medium as above. After good growth 100 mg. of a compound selected from five different benzodiazepine Compounds A to E represented by the general formula:

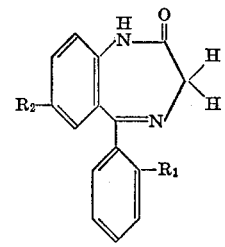

but different in $R_1$ and $R_2$ as shown in Table IV in 2.0 ml. of ethanol was added to each flask.

TABLE IV

|  | A | B | C | D | E |
|---|---|---|---|---|---|
| $R_1$ | Cl | Cl | F | F | $CH_3$ |
| $R_2$ | Cl | $NO_2$ | Cl | $NO_2$ | Cl |

After further 7 days incubation, culture fluids were extracted as described in Example 1 and purified as in Example 2, by which yielded 3-hydroxy derivatives of the substrate Compounds A to E, respectively.

The identity of those compounds was established by IR spectroscopy.

EXAMPLE 15

*Streptomyces fimicarius* S-12 (FERM-P No. 945) was grown on the same medium described as Example 13. After 24 hours incubation a mycelial transfer (2%) was made to each of ten new flasks containing 100 ml. of the same medium as above. After good growth 100 mg. of a compound selected from four different benzodiazepine Compounds A to D represented by the general formula:

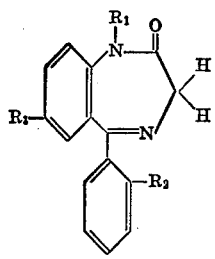

but different in $R_1$, $R_2$ and $R_3$ as shown in Table V in 2.0 ml. of ethanol was added to each flask.

TABLE V

| | A | B | C | D |
|---|---|---|---|---|
| $R_1$ | $CH_3$>CH—$CH_2$— $CH_3$ | $HOCH_2$—$CH_2$— | $CH_3O$—$CH_2$— | $CH_3$—S—$CH_2$— |
| $R_2$ | H | F | H | H |
| $R_3$ | Cl | Cl | Cl | Cl |

After further 7 days incubation, culture fluids were extracted as described in Example 1 and purified as in Example 2, by which yielded the compounds represented by the general formula:

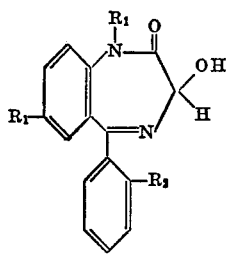

but different in $R_1$, $R_2$ and $R_3$ as shown in Table VI.

TABLE VI

| | Substrate | | | | | | | |
|---|---|---|---|---|---|---|---|---|
| | A | | B | | C | | D | |
| $R_1$ | ▽—$CH_3$ | H | $HOCH_2$—$CH_2$— | H | $CH_3O$—$CH_2$— | H | $CH_3S$—$CH_2$— | H |
| $R_2$ | H | H | F | F | H | H | H | H |
| $R_3$ | Cl | Cl | Cl | Cl | Cl | Cl | Cl | Cl |

The identity of those compounds was established by IR spectroscopy and thin layer chromatography.

What we claim is:

1. A method of causing the microbial transformation of a benzodiazepine compound of the formula

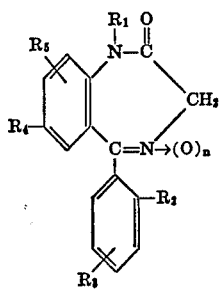

(I)

wherein $R_1$ is selected from the group consisting of hydrogen, carbamoyl, $C_1$–$C_4$ alkylcarbamoyl, $C_1$–$C_4$ alkyl, $C_2$–$C_5$ alkenyl, $C_3$–$C_5$ alkynyl, and $C_1$–$C_4$ alkyl, $C_2$–$C_5$ alkenyl and $C_3$–$C_5$ alkynyl substituted by one to three radicals selected from the group consisting of halogen, $C_3$–$C_6$ cycloalkyl, aryl, a heterocyclic ring, aralkyl, acyl, carbamoyl, $C_1$–$C_4$ alkylcarbamoyl, amino, $C_1$–$C_4$ alkylamino, di $C_1$–$C_4$ alkylamino and —X—$R_6$, wherein X is a member of the group consisting of oxygen, sulfur, sulfonyl and sulfinyl, and $R_6$ is a member of the group consisting of hydrogen, $C_1$–$C_4$ alkyl, $C_1$–$C_4$ alkoxy, $C_1$–$C_4$ alkyl, halo $C_1$–$C_4$ alkyl, $C_2$–$C_5$ alkenyl, $C_3$–$C_5$ alkynyl, aryl, acyl, aralkyl, a heterocyclic ring, carbamoyl and $C_1$–$C_4$ alkylcarbamoyl, $R_2$ is selected from the group consisting of hydrogen, halogen and $C_1$–$C_4$ alkyl, $R_3$ is selected from the group consisting of hydrogen, halogen, $C_1$–$C_4$ alkyl and $C_1$–$C_4$ alkoxy, $R_4$ is selected from the group consisting of halogen, trifluoromethyl, $C_1$–$C_4$ alkoxy, $C_1$–$C_4$ alkyl and nitro, $R_5$ is selected from the group consisting of hydrogen, halogen, $C_1$–$C_4$ alkyl and $C_1$–$C_4$ alkoxy and $n$ is 0 or 1 which comprises fermenting a compound of Formula I in the presence of a strain of Streptomyces having a 3-hydroxylating enzyme system to obtain a compound of the formula

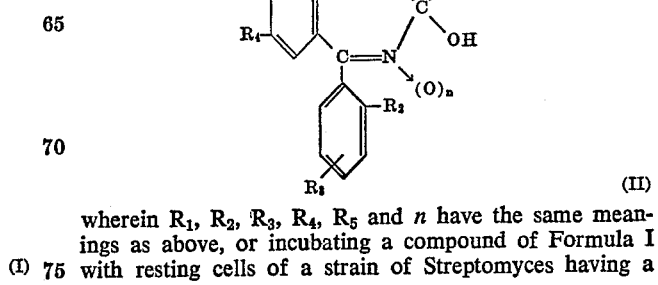

(II)

wherein $R_1$, $R_2$, $R_3$, $R_4$, $R_5$ and $n$ have the same meanings as above, or incubating a compound of Formula I with resting cells of a strain of Streptomyces having a 3-hydroxylating enzyme system previously grown in a culture medium to obtain a compound of Formula II.

2. A method according to claim 1, wherein in the compound of Formula II, $R_1$ is selected from the group consisting of hydrogen, $C_1$–$C_4$ alkyl and cyclo $C_2$–$C_6$ alkyl, $R_2$ is selected from the group consisting of hydrogen and halogen, $R_3$ is hydrogen, $R_4$ is selected from the group consisting of halogen, trifluoromethyl, $C_1$–$C_4$ alkoxy, $C_1$–$C_4$ alkyl and nitro, $R_5$ is hydrogen and $n$ is 0.

3. A method according to claim 1, wherein in the compound of Formula I, $R_1$ is hydrogen, lower alkyl or cycloalkyl, $R_2$ is selected from the group consisting of halogen and hydrogen, $R_3$ is hydrogen, $R_4$ is selected from the group consisting of halogen and nitro, $R_5$ is hydrogen and $n$ is 0, and in the compound of Formula II $R_1$, $R_2$, $R_3$, $R_4$, $R_5$ and $n$ have the same meanings as above.

4. A method according to claim 1, wherein the compound of Formula I is 1-cyclopropylmethyl-5-phenyl-7-chloro-1,3-dihydro-2H-1,4-benzodiazepine-2-one and the compounds of Formula II obtained are 1-cyclopropylmethyl-3-hydroxy-5-phenyl-7 - chloro - 1,3-dihydro-2H-1,4-benzodiazepine-2-one and 3-hydroxy-5-phenyl-7-chloro-1,3-dihydro-2H-1,4-benzodiazepine-2-one.

5. A method according to claim 1, wherein the compound of Formula I is 5-(2'-fluorophenyl)-7-chloro-1,3-dihydro-2H-1,4-benzodiazepine-2-one and the compound of Formula II obtained is 3-hydroxy-(5-(2'-fluorophenyl)-7-chloro-1,3-dihydro-2H-1,4-benzodiazepine-2-one.

6. A method according to claim 1, wherein the compound of Formula I is 1-methyl-5-phenyl-7-chloro-1,3-dihydro-2H-1,4-benzodiazepine-2-one and the compounds of Formula II obtained are 1-methyl-3-hydroxy-5-phenyl-7-chloro-1,3 - dihydro - 2H-1,4-benzodiazepine-2-one and 3-hydroxy-5-phenyl-7-chloro - 1,3 - dihydro-2H-1,4-benzodiazepine-2-one.

7. A method according to claim 1, wherein the compound of Formula I is 1-methyl-5-phenyl-7-nitro-1,3-dihydro-2H-1,4-benzodiazepine-2-one and the compounds of Formula II obtained are 1-methyl-3-hydroxy-5-phenyl-7-nitro-1,3-dihydro-2H - 1,4-benzodiazepine-2-one and 3-hydroxy-5-phenyl-7-nitro-1,3 - dihydro - 2H-1,4-benzodiazepine-2-one.

8. A method according to claim 1, wherein the compound of Formula I is 1-methyl-5-phenyl-7-trifluoromethyl-1,3-dihydro-2H-1,4-benzodiazepine-2-one and the compounds of Formula II obtained are 1-methyl-3-hydroxy-5-phenyl-7-trifluoromethyl-1,3-dihydro-2H-1,4-benzodiazepine - 2 - one and 3-hydroxy-5-phenyl-7-trifluoromethyl-1,3-dihydro-2H-1,4-benzodiazepine-2-one.

9. A method according to claim 1, wherein the compound of Formula I is 5-phenyl-7-chloro-1,3-dihydro-2H-1,4-benzodiazepine-2-one and the compound of Formula II obtained is 3-hydroxy-5-phenyl-7-chloro-1,3-dihydro-2H-1,4-benzodiazepine-2-one.

10. A method according to claim 1, wherein the compound of Formula I is 1-methyl-5-(2'-chlorophenyl)-7-chloro-1,3-dihydro-2H-1,4-benzodiazepine-2-one and the compounds of Formula II obtained are 1-methyl-3-hydroxy-5-(2'-chlorophenyl) - 7 - chloro-1,3-dihydro-2H-1,4-benzodiazepine-2-one and 3-hydroxy-5 - (2'-chlorophenyl) - 7 - chloro-1,3-dihydro-2H-1,4-benzodiazepine-2-one.

11. A method according to claim 1, wherein the compound of Formula I is 5-phenyl-7-trifluoromethyl-1,3-dihydro-2H-1,4-benzodiazepine-2-one and the compound of Formula II obtained is 3-hydroxy-5-phenyl-7-trifluoromethyl-1,3-dihydro-2H-1,4-benzodiazepine-2-one.

12. A method according to claim 1, wherein the Streptomyces is *Streptomyces albidoflavus* ATCC 15844.

13. A method according to claim 1, wherein the Streptomyces is *Streptomyces flavus* ATCC 3369.

14. A method according to claim 1, wherein the Streptomyces is *Streptomyces griseochromogenes* ATCC 14511.

15. A method according to claim 1, wherein the Streptomyces is *Streptomyces roseochromogenes* IFO 3363.

16. A method according to claim 1, wherein the Streptomyces is *Streptomyces fradiae* IFO 3360.

17. A method according to claim 1, wherein the Streptomyces is *Streptomyces griseus* IFO 3102.

18. A method according to claim 1, wherein the Streptomyces is *Streptomyces takarazukaensis* S–3 FERM-P No. 943.

19. A method according to claim 1, wherein the Streptomyces is *Streptomyces calvus* S–4 FERM-P No. 944.

20. A method according to claim 1, wherein the Streptomyces is *Streptomyces fimicarius* S–12 FERM-P No. 945.

21. A method according to claim 1, wherein the Streptomyces is *Streptomyces chartreusis* S–19 FERM-P No. 946.

22. A method according to claim 1, wherein the Streptomyces is *Streptomyces transformans* S–60 FERM-P No. 947.

23. A method according to claim 1, wherein the Streptomyces is *Streptomyces globisporus* S–120 FERM-P No. 948.

24. A method according to claim 1, wherein the Streptomyces is *Streptomyces benzodiazepinicus* S–145 FERM-P No. 949.

References Cited
UNITED STATES PATENTS 3,453,179   7/1969   Greenspan et al. _____ 195—51 R ALVIN E. TANENHOLTZ, Primary Examiner U.S. Cl. X.R.
260—251; 424—244